(12) United States Patent
Kleinsasser

(10) Patent No.: US 7,017,522 B2
(45) Date of Patent: Mar. 28, 2006

(54) FARROWING CRATE WITH A LOW PROFILE FEEDER

(75) Inventor: Jonathan Kleinsasser, Ste. Agathe (CA)

(73) Assignee: Crystal Spring Colony Farms Ltd., Ste. Agathe (CA)

(*) Notice: Subject to any disclaimer, the term of this patent is extended or adjusted under 35 U.S.C. 154(b) by 94 days.

(21) Appl. No.: 10/807,507

(22) Filed: Mar. 24, 2004

(65) Prior Publication Data

US 2005/0211181 A1    Sep. 29, 2005

(51) Int. Cl.
*A01K 1/00* (2006.01)

(52) U.S. Cl. .................. 119/521; 119/515; 119/61.3; 119/61.54

(58) Field of Classification Search ............... 119/521, 119/515, 454, 456, 464, 475, 52.1, 52.4, 53, 119/53.5, 61.1, 61.3, 61.54
See application file for complete search history.

(56) References Cited

U.S. PATENT DOCUMENTS

| | | | | |
|---|---|---|---|---|
| 516,906 | A * | 3/1894 | Auchly | 119/515 |
| 1,000,624 | A * | 8/1911 | Pexton | 229/122.1 |
| 1,367,614 | A | 2/1921 | Maciejewski | |
| 2,775,226 | A * | 12/1956 | Early | 119/52.2 |
| 3,033,164 | A * | 5/1962 | Evers | 119/54 |
| 3,415,227 | A * | 12/1968 | Welsh | 119/524 |
| 3,543,723 | A * | 12/1970 | Gilst | 119/521 |
| 4,129,096 | A * | 12/1978 | Nickel | 119/521 |
| 4,231,326 | A * | 11/1980 | Hager | 119/52.1 |
| 4,503,809 | A | 3/1985 | Watkins, Sr. | |
| 4,505,227 | A * | 3/1985 | Hartke et al. | 119/52.1 |
| 4,528,943 | A | 7/1985 | Proctor | |
| 6,691,642 | B1 * | 2/2004 | Dollahan | 119/58 |
| 2004/0118353 | A1 * | 6/2004 | Botterman et al. | 119/72 |

FOREIGN PATENT DOCUMENTS

| | | |
|---|---|---|
| CA | 2460880 | 10/2004 |
| EP | 0 970 604 | 1/2000 |
| GB | 2131268 | 12/1983 |

* cited by examiner

*Primary Examiner*—Yvonne R. Abbott
(74) *Attorney, Agent, or Firm*—Adrian D. Battison; Michael R. Williams; Ryan W. Dupuis

(57) ABSTRACT

A farrowing crate is defined by a cage having a main central flooring section for the sow and two side sections for the piglets. A feeder is located at the front wall for supplying feed to the sow when standing and includes a hopper mounted on a front gate outside the crate for and a trough for receiving feed discharged from the hopper. The trough is formed by a base plate lying substantially flat on the flooring from the hopper rearwardly to a raised transverse restricting member to restrict the escape of feed formed by an inverted V-shaped rib formed in the base plate spaced from the front wall and extending generally across the base plate to define a trough area of a height which allows the sow to lie with its neck and head over the restricting member without discomfort. The gate panel includes guards each side of the opening to restrict side to side movement of the sow's head. The trough is restricted by sides at the sides of the sow flooring.

21 Claims, 6 Drawing Sheets

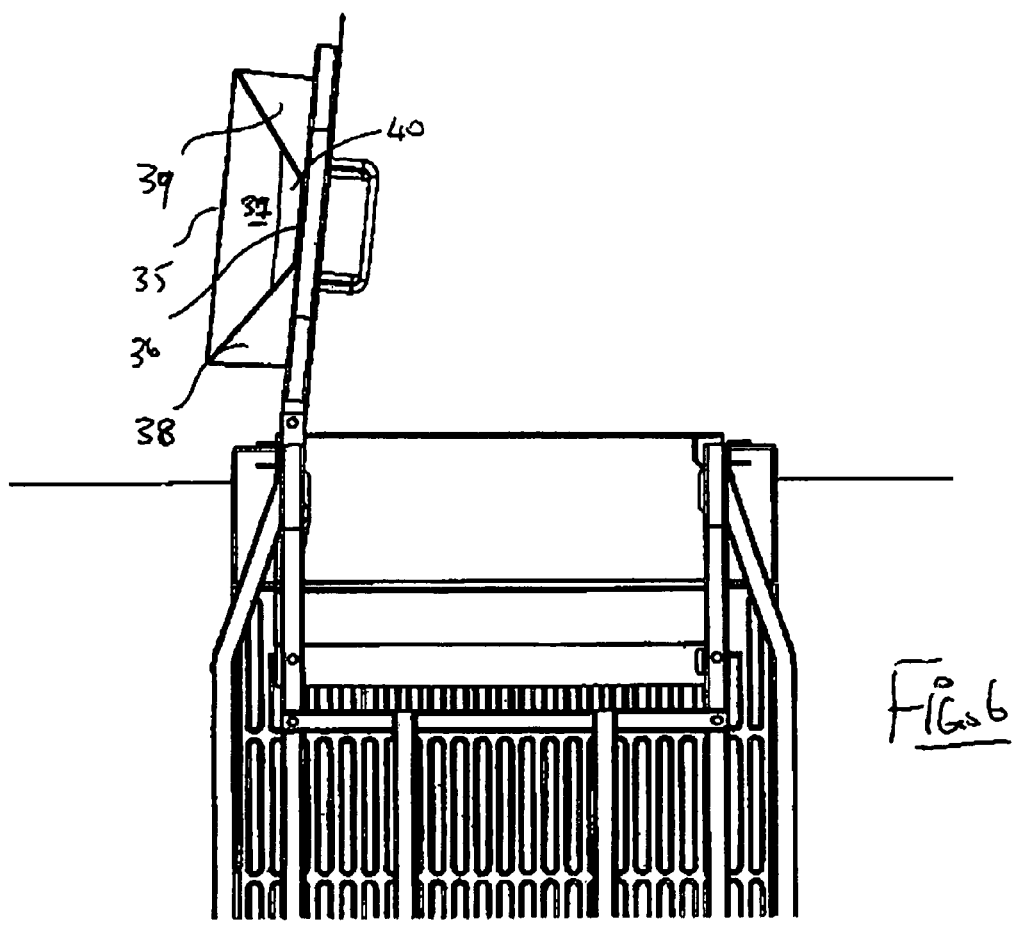

FARROWING CRATE WITH A LOW PROFILE FEEDER

This invention relates to a farrowing crate with a feeder for the sow which allows the sow to lie in the crate and at least partly into the feeder for lying comfort, and to a feeder for mounting in a farrowing crate.

BACKGROUND OF THE INVENTION

In the business of raising hogs, one of the operations involves the placement of the sow in a farrowing crate for birthing and raising the piglets during their initial phase of life until they can be weaned and moved away from the sow to continue the cycle.

Farrowing crates therefore have been designed and built for many years to contain the sow in a central elongate area of the farrowing crate and to contain the piglets in two side areas where they can move at will and access the sow when lying for feeding.

The sow also must be able to stand and feed while in the farrowing crate so the feeder is generally placed at the forward end of the farrowing crate to allow the sow to take feed at will to maintain body weight for subsequent procedures.

Such farrowing crates are manufactured at minimum dimensions so as to maximize the number of sows contained in a particular area. There is pressure therefore to maintain the length of the crate as short as possible in new crates manufactured at this time and in addition there are existing crates which have been manufactured previously at a predetermined size.

In the meantime, improved breeding of the animals has led to an increase in size so that they sows tend to be bigger and longer than previous times when the dimensions of the crate were developed.

It is common for the sows in a gestation stall to be fed simply by a drop tube which deposits a measured quantity of feed onto the floor of the stall. An example of an arrangement of the type is shown in as fully described and claimed in United States application filed Apr. 14, 2003, Ser. No: 10/412,665 entitled "PEN AND ATTACHED FEEDING APPARATUS FOR AN ANIMAL", and in corresponding Canadian application filed Mar. 12, 2004, Ser. No: 2,460, 880. The deposit of feed onto the floor in this manner is possible using a drop tube which drops substantially all of the feed simultaneously onto the floor in a measured quantity. However this system tends for feed to be wasted and requires control of the measurement of the quantities.

An alternative arrangement utilises a feeder of the type comprising a hopper which drops feed into a trough with the amount of feed in the trough being controlled by the repose angle of the feed so only a certain quantity of the feed from the hopper discharges into trough at any one time until further feed is removed allowing the repose angle to change and further feed to fall. Commonly feeders of this type are mounted on the front gate where the hopper is carried on the front gate and the trough is formed as a bowl with a peripheral lip and a bottom wall extending downwardly from the peripheral lip to catch the feed. The trough is carried on the front gate at a height above the floor and projects into the crate by a distance of the order of 12 inches so as to provide a trough of a sufficient size that the animal can reach into the trough for taking feed from the base of the trough. As the hopper and the trough are on the inside of the gate, this arrangement takes up space within the crate and locates the lip of the trough approximately one foot from the gate within the crate so that it crowds the animal rearwardly and reduces the space available for the animal to lie. The trough therefore can be a discomfort to the animal, particularly where the animal is relatively large and of course such discomfort is to be avoided.

SUMMARY OF THE INVENTION

It is one object of the invention to provide a farrowing crate and a feeder therefor which allows increased lying area for the sow.

According to one aspect of the invention there is provided a farrowing crate comprising;

a cage defined by a front wall, a rear wall and two side walls shaped and arranged to contain a farrowing sow and its piglets;

a flooring on which the sow can lie within the cage and can stand at will for taking feed and water;

and a feeder at the front wall for supplying feed to the sow when standing;

the feeder comprising;

a hopper for containing feed for supply to the sow, a trough for receiving feed discharged from the hopper for taking by the sow while standing;

the trough comprising a base plate arranged to lie substantially flat on the flooring and extend from the front wall rearwardly over the flooring;

the base plate forming the trough having a raised transverse restricting member spaced from the front wall and extending generally across the base plate to define a trough area of the base plate forwardly of the transverse restricting member;

the transverse restricting member being shaped so as to have a height which tends to restrain feed from escaping from the trough area rearwardly;

and the transverse restricting member being shaped so as to allow the sow to lie on the flooring with its head extending over the transverse restricting member into the trough area without causing discomfort to the lying sow.

Preferably the base plate is flat.

Preferably the base plate lies directly on the flooring.

Preferably the hopper and the discharge opening are arranged relative to the base plate so that an angle of repose of the feed material acts to restrict flow of feed from the hopper onto the base plate and to replace fresh feed only when feed is taken away.

Preferably the base plate includes a portion extending rearwards from the transverse restricting member for receiving any feed escaping over the transverse restricting member.

Preferably the flooring includes a sow section for receiving the sow when lying or standing and at least one side portion for receiving the piglets and wherein the trough includes upstanding side walls at or adjacent the sides of the sow section to restrict feed from escaping over the sides of the trough.

Preferably the transverse restricting member extends fully across the trough from one side to the other side.

Preferably the hopper includes a discharge opening for discharging the feed into the trough at the front wall.

Preferably there are provided side restriction members on each side of the discharge opening at the front wall to restrict side to side movement of the head of the sow during feeding.

Preferably the hopper is located outside the front wall and the discharge opening extends through the front wall.

Preferably the front wall includes a gate and wherein the hopper is mounted on the gate.

Preferably the trough is fixed to the flooring such that the opening of the gate moves the hopper away from a front edge of the trough.

Preferably the raised transverse restriction member includes a front surface, a rear surface and a smoothly curved top edge.

Preferably the front surface and the rear surface are inclined to form an inverted V-shape in cross-section, although the V-shape may not be equally inclined on both sides of the apex.

Preferably the raised transverse restricting member has a height no greater than 2.0 inches from the base plate and more preferably about 1.0 inches.

According to a second aspect of the invention there is provided a feeder for mounting at a gate of an animal containment cage comprising;

a hopper for containing feed for supply to the sow and having a discharge opening through which the feed falls, a trough for receiving feed discharged from the hopper;

the trough comprising a base plate arranged to lie substantially flat on a floor and extend from a front edge rearwardly over the floor;

wherein the hopper and the discharge opening are arranged relative to the base plate so that an angle of repose of the feed material acts to restrict flow of feed from the hopper onto the base plate and to replace fresh feed only when feed is taken away;

the base plate forming the trough having a raised transverse restricting member spaced from the front edge and extending generally across the base plate to define a trough area of the base plate forwardly of the transverse restricting member;

the transverse restricting member being shaped so as to have a height which tends to restrain feed from escaping from the trough area rearwardly;

and the transverse restricting member being shaped so as to allow an animal to lie on the floor with its head extending over the transverse restricting member into the trough area without causing discomfort to the lying animal.

BRIEF DESCRIPTION OF THE DRAWINGS

One embodiment of the invention will now be described in conjunction with the accompanying drawings in which:

FIG. 6 is a top plan view of the crate again with the gate in the opened condition.

In the drawings like characters of reference indicate corresponding parts in the different figures.

DETAILED DESCRIPTION

Figure 1:
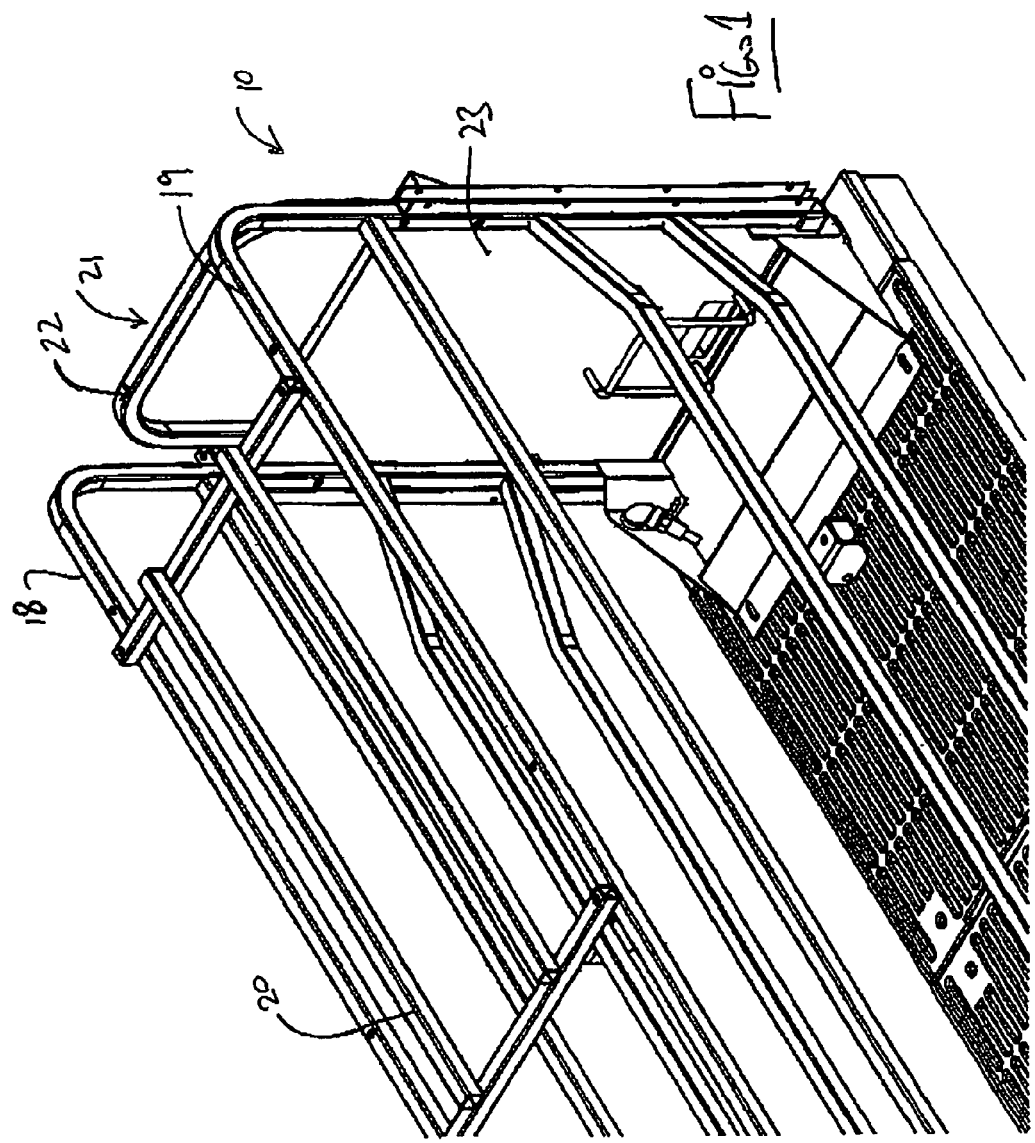
FIG. 1 is an isometric view of the forward end of a farrowing crate showing a feeder according to the present invention located at the front of the crate with the hopper mounted onto the front gate of the crate.
Figure 2:
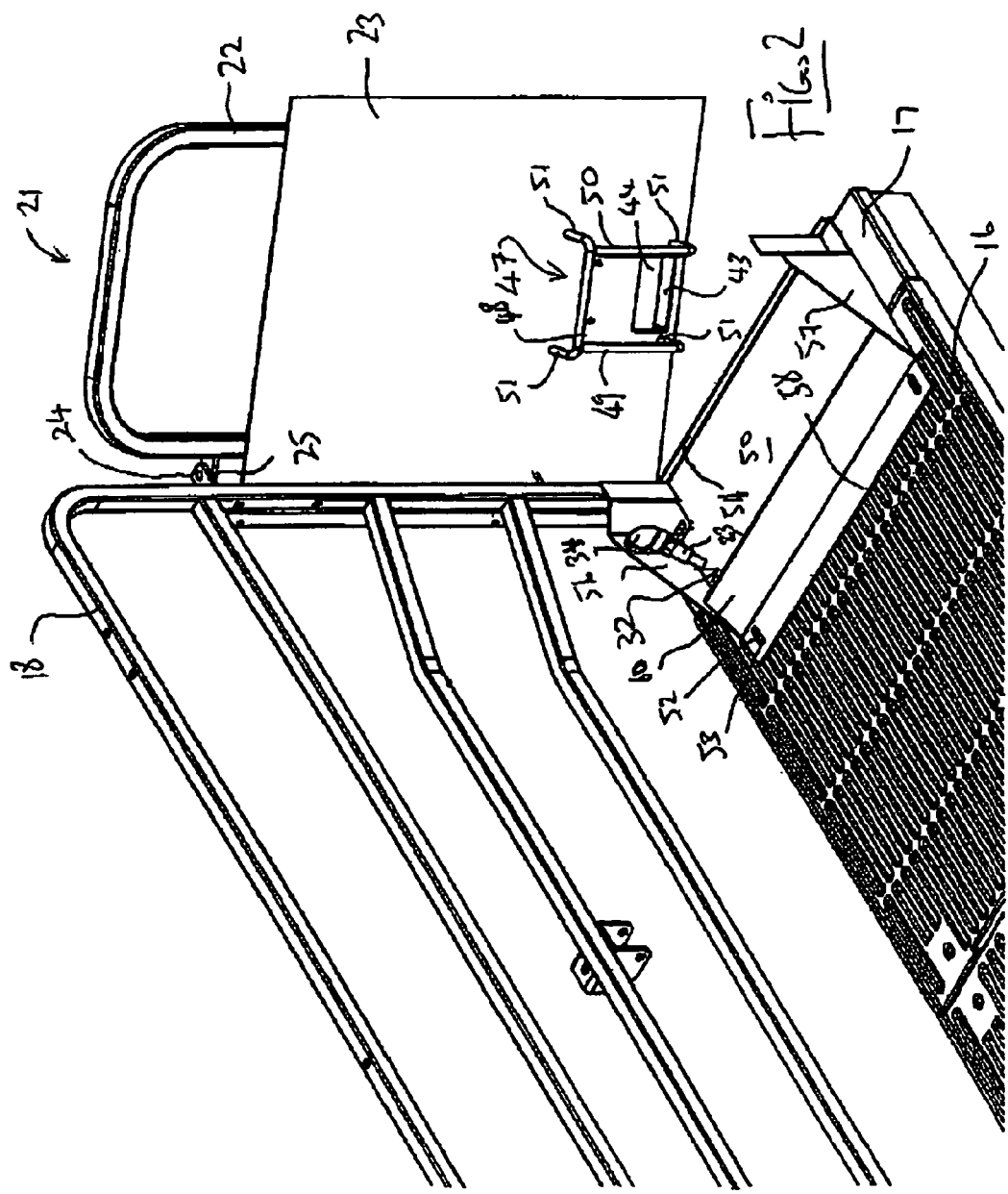
FIG. 2 is a similar isometric view with the adjacent side of the crate removed for convenience of illustration and showing the front gate in a partly opened condition.
Figure 3:
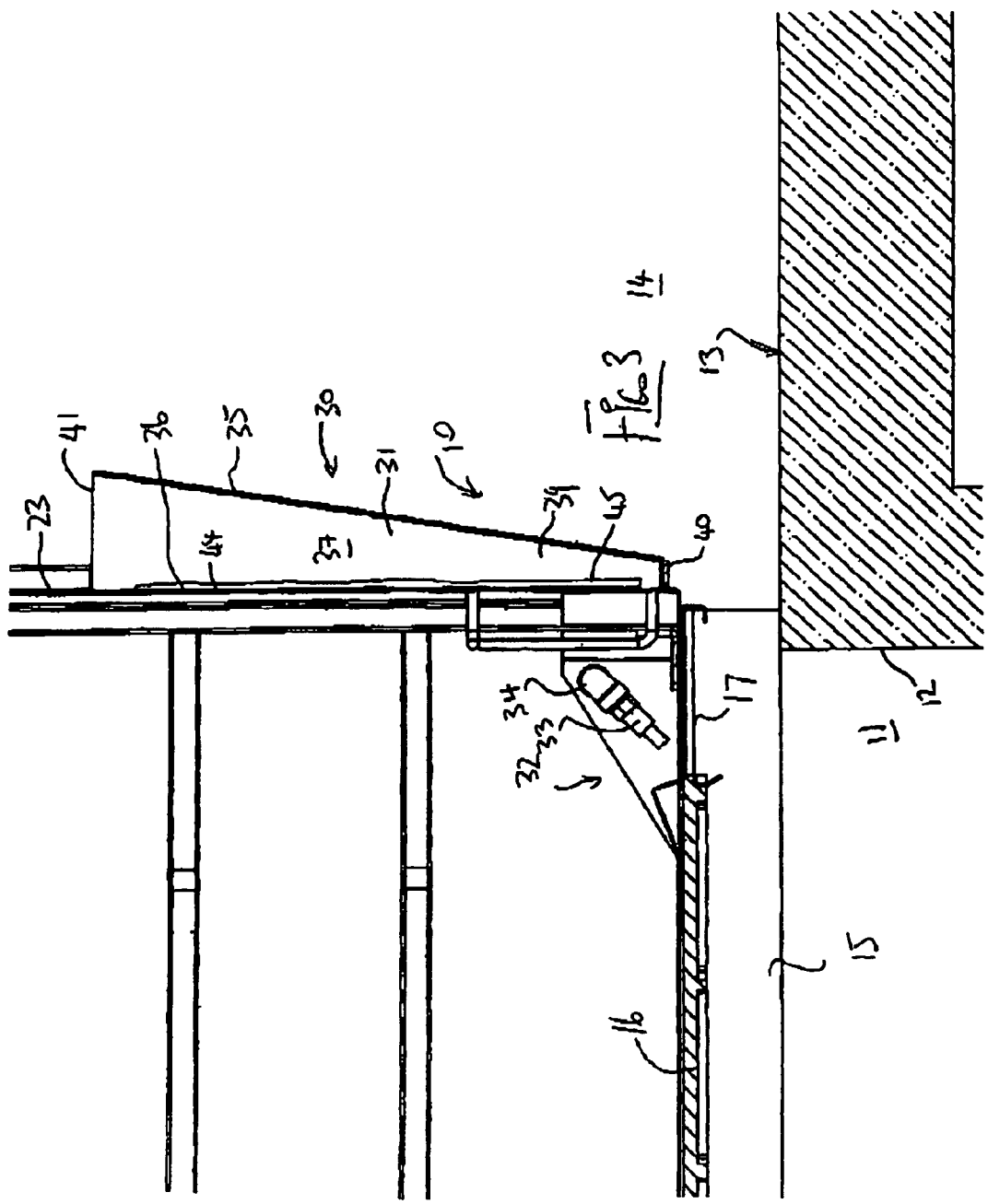
FIG. 3 is a longitudinal cross sectional view of the farrowing crate of FIG. 1.
Figure 4:
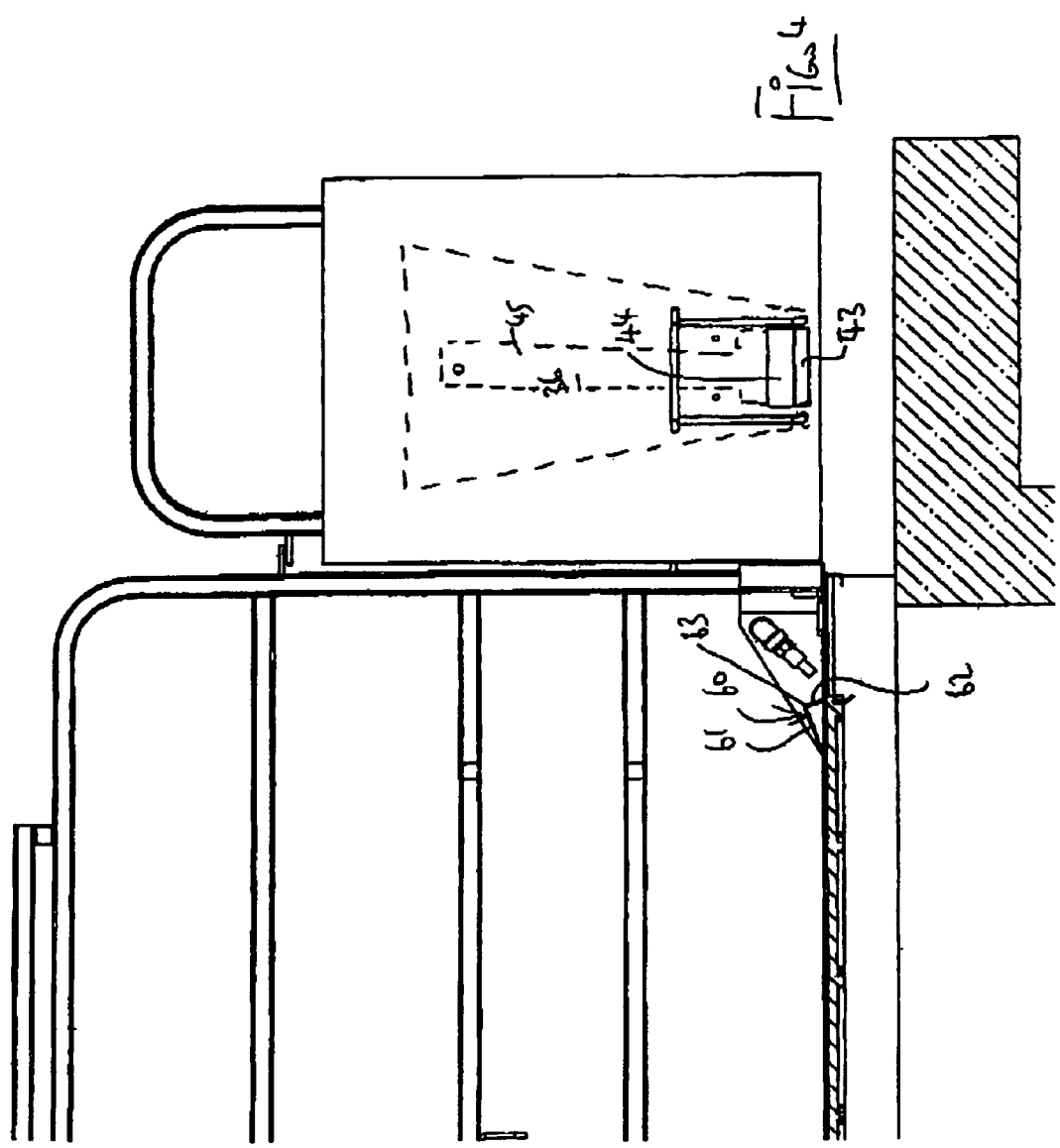
FIG. 4 is a longitudinal cross sectional view similar to that of FIG. 3 showing the gate in the opened position.
Figure 5:
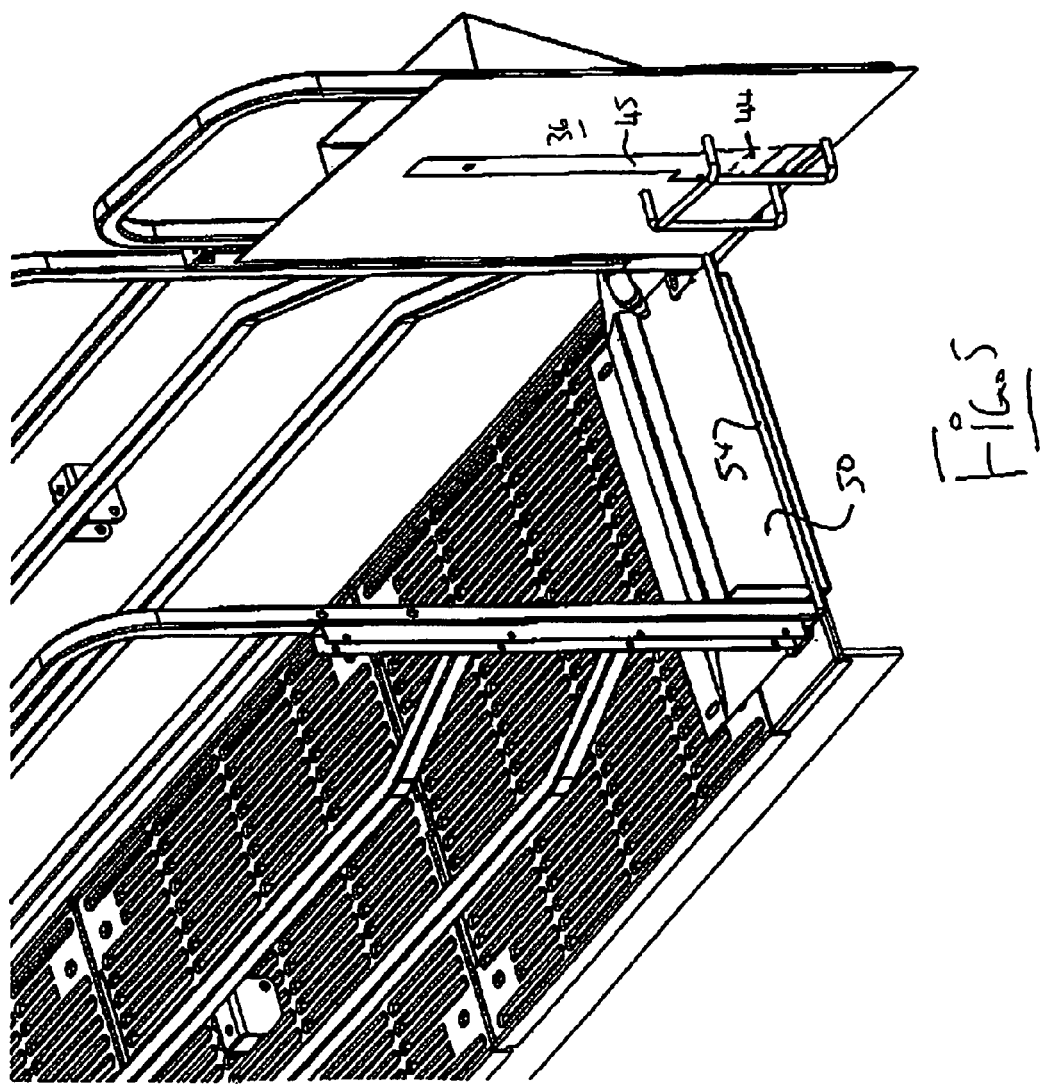
FIG. 5 is an isometric view of the crate from the front showing the gate in a opened condition.

In the Figures is shown a farrowing crate generally indicated at 10 which is arranged alongside similar farrowing crates each of which contains a sow and its piglets in the farrowing process. The farrowing crate 10 is mounted over a pit 11 formed by concrete walls 12 and a concrete floor 13 defining an alleyway 14 at the front of the crate 10.

Over the pit 11 is mounted a frame 15 which supports a flooring 16 on which the sow can lie and stand at will. The flooring 16 is generally a grate type structure providing slots and openings to allow waste to fall through the flooring into the pit for collection. At the front of the grate type flooring 16 is provided a floor panel 17 which extends across the frame 15 at the front of the crate. Along the sides of the flooring grate 16 is provided a separate flooring system for the piglets which is not shown but is of a conventional nature. The piglet flooring may also be perforated with openings and/or slots and may be heated as is well known to one skilled in the art.

The crate defines a cage having side walls 18 and 19 which are carried on the frame so as to be parallel and along the sides of the flooring grate 16 to confine the sow to the area over the flooring grate. The shape and arrangement of the sides is again of a conventional nature and many different designs can be provided to restrict the sow from entering into the area defined for the piglets so as to prevent the piglets from being crushed when the sow lies. Details of the construction of the sides therefore will not be described herein except to say that the sides are formed by bars defining the cage which confines the sow. A roof structure 20 bridges the two sides and holds the sides parallel and vertical again to confine the animal within the cage. A front gate 21 closes the opening at the front of the crate between the side walls and comprises a frame 22 defined by vertical bars and horizontal cross bars together with a covering sheet 23 on the front side of the frame so as to be presented to the sow as a closure panel covering the front opening of the crate and spanning the side walls 18 and 19. The gate panel 21 is pivotally mounted on hinge pins 24 mounted on lugs 25 carried on one of the side frames 18 and 19. A suitable closure member (not shown) locks the gate in the closed position against the other of the side panels to hold the gate in the closed position during normal operation. The opening of the gate is primarily to allow the release of the animal when required or to allow access to the front of the animal should this be necessary for any particular reason.

A feeder is provided at the front of the farrowing crate for feeding the sow on demand while avoiding interference with the sow lying along substantially the full length of the crate. The feeder 30 comprises a hopper 31 mounted on the panel 23 and a trough 32 mounted on the flooring within the crate. A water nipple 33 can be actuated by the animal to discharge water into the trough from a water supply 34.

The hopper 31 comprises a front wall 35 which lies generally parallel to the panel 23 and particularly a portion 36 thereof so as to define a hopper container 37 between the panels 35 and 36 into which feed can be received. Thus the panel 35 and the hopper 37 are located outside of the sheet 36 so that they do not penetrate into the interior of the crate. The hopper further includes two side walls 38 and 39 which converge downwardly and inwardly so that the bottom 40 of the hopper is much smaller than a top open mouth 41 of the hopper. Thus the panel 35 tapers towards the bottom 40 and also the side walls 38 and 39 taper towards the bottom 40. At the bottom 40 of the hopper is provided an opening or rectangular hole 43 through the panel 36 so as to allow the feed within the hopper to flow through the opening 43 into the crate at a position adjacent the flooring. The dimensions of the hole can be adjusted by moving vertically a plate 44 on a slide 45 which is adjustable on the outside surface of the panel 36 within the hopper by a top adjustment system operable by the user outside the crate. The plate 44 can also be moved to a fully closed position abutting the bottom 40 of the hopper so as to close off the opening 43 and prevent further escape of feed material when the gate is opened to prevent the feed from being discharged and wasted.

Thus the opening 43 defines a slot across a relatively small part of the width of the panel 23 and at the centre of the panel. A guard arrangement 47 is mounted on the panel 23 around the slot 43 so as to restrict movement of the snout of the sow when at the slot 43. Thus the guard comprises a horizontal bar 48 and two vertical bars 49 and 50. The horizontal bar 48 is located above the slot 43 and the vertical bars 49 and 50 on each side of the slot. The bars are mounted at a position spaced away from the panel 23 by mounting arms 51 which interconnect the ends of the horizontal bar 48 to the panel at the top of the guard and connect the bottom of the vertical bars to the panel at the bottom of the guard. This structure therefore forms a rectangle generally surrounding the slot 43 and spaced away from the slot by a distance of the order of two inches so that the snout of the sow when rooting and the slot cannot move freely side to side which could cause the feed at the slot to be spread widely and thus potentially wasted.

The trough 32 comprises a base plate 50 which is laid over the flooring so as to cover the edge strip 17 and part of the floor grating 16. The base plate is flat on the floor and is fastened to the flooring by bolts 52 passing through holes 53 in the base plate at some suitable location conveniently engaging into the openings in the floor grating 16. The base plate thus lies flat over the flooring and has a raised lip 54 at the front edge standing upwardly across the full width of the base plate as a restraining lip to prevent feed material from falling off the base plate forwardly when the gate panel is opened. The inside surface of the front panel 23 buts against the outside surface of the lip or flange 54 when the gate is in the closed position so as to provide a seal to prevent the free escape of the feed at the front of the base plate. The seal is of course not necessarily watertight but is merely sufficient to prevent the escape of feed during normal feeding activities.

At the sides of the trough is provided a pair of upstanding side walls 56 and 57 which define sides for the trough and are attached to the base plate 50 so as to stand upwardly therefrom to prevent feed from escaping over the sides. The sides are generally triangular so they are higher at the panel 23 but reduce in height rearwardly towards the rear edge of the base plate as indicated at 58 on the flooring 16. Thus the side walls act to confine the material in the area adjacent the gate but are reduced in height as they extend into the farrowing crates so as to prevent their interfering with the animal or providing uncomfortable raised side edges which can injure or hurt the animal.

The water supply 33 provides a pipe which extends through one of the side walls and is mounted thereto thus holding the nipple 33 in fixed position adjacent the base plate 50 but operable by the animal to run water into the trough on the base plate.

A raised transverse restricting member 60 is provided on the base plate at a position spaced from the flange 54 and forming a rear edge of the trough. The transverse restricting member is generally V-shaped in cross section so as to provide a rear side wall 61 facing towards the animal and away from the gate and a front side wall 62 which faces away from the animal and towards the front gate.

The side walls converge to an upper apex 63 which is preferably smoothly curved so as to avoid presenting a sharp edge. The side walls define an angle of the order of 90 degrees or a relatively wide angle so that the upper apex is not sharp but is sufficiently angled to avoid cutting into the neck of the animal in the event that the animal lies on the flooring with its head in the trough and its neck extending over the transverse restricting member. The rear wall 61 is at a shallower angle than the front wall 62 again so as to provide a shallow wall adjacent the animal and a sharper wall 62 facing the trough. The transverse restricting member thus forms a rib across the full width of the trough between the side walls which acts to restrain feed material to the trough area between the front wall 62 and the flange 54. The height of the apex is preferable of the order of one inch from the base plate and preferably no greater than two inches from the base plate so as to avoid causing a painful or injurious projection into the neck of the animal when lying over the restricting member.

The transverse restricting member is located spaced from the rear edge 58 of the base plate so as to provide a relatively short piece of the base plate beyond the transverse restricting member onto which feed can fall should any feed escape over the transverse restricting member.

It is not intended that the transverse restricting member prevent necessarily all feed from escaping from the trough but instead is a restriction to maintain as much as possible of the feed within the trough area so that little is wasted. At the same time the transverse restricting member is shaped and arranged so that the animal can lie on its side with its neck or head extending over the transverse restricting rib so that part of its neck is on the flooring and part of its neck or head is within the trough area, without the transverse restricting member providing any discomfort or injurious effect to the animal. Thus the animal can lie with its snout right up against the end sheet 23 providing the maximum amount of area within the crate for the animal to lie comfortably on its side.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A farrowing crate comprising;
    a cage defined by a front wall, a rear wall and two side walls shaped and arranged to contain a farrowing sow and its piglets;
    a flooring shaped and arranged within the cage such that the sow can lie on the flooring within the cage and can stand at will for taking feed and water while confined along the flooring by the cage;
    and a feeder at the front wall for supplying feed to the sow when standing;
    the feeder comprising;
    a trough for receiving feed for taking by the sow while standing;
    a hopper for receiving feed from a supply and including a discharge for discharging the feed into the trough;
    the trough comprising a base plate arranged to lie substantially flat on the flooring and extend from the front wall rearwardly over the flooring;
    the base plate forming the trough having a raised transverse restricting member spaced from the front wall and extending generally across the base plate to define a trough ares of the base plate forwardly of the transverse restricting member;

the transverse restricting member being shaped so as to have a height which tends to restrain feed from escaping from the trough area rearwardly;

and the transverse restricting member being shaped so as to allow the sow to lie on the flooring with its head extending over the transverse restricting member into the trough area without causing discomfort to the lying sow.

2. The farrowing crate according to claim 1 wherein the base plate is flat.

3. The farrowing crate according to claim 1 wherein the base plate lies directly on the flooring.

4. The farrowing crate according to claim 1 wherein the hopper and the discharge opening are arranged relative to the base plate so that an angle of repose of the feed material acts to restrict flow of feed from the hopper onto the base plate and to replace fresh feed only when feed is taken away.

5. The farrowing crate according to claim 1 wherein the base plate includes a portion extending rearwards from the transverse restricting member for receiving any feed escaping over the transverse restricting member.

6. The farrowing crate according to claim 1 wherein the flooring includes a sow section for receiving the sow when lying or standing and at least one side portion for receiving the piglets and wherein the trough includes upstanding side walls at or adjacent the sides of the sow section to restrict feed from escaping over the sides of the trough.

7. The farrowing crate according to claim 6 wherein the transverse restricting member extends fully across the trough from one side to the other side.

8. The farrowing crate according to claim 1 wherein the hopper includes a discharge opening for discharging the feed into the trough at the front wall.

9. The farrowing crate according to claim 8 wherein there are provided side restriction members on each side of the discharge opening at the front wall to restrict side to side movement of the head of the sow during feeding.

10. The farrowing crate according to claim 8 wherein the hopper is located outside the front wall and the discharge opening extends through the front wall.

11. The farrowing crate according to claim 8 wherein the front wall includes a gate and wherein the hopper is mounted on the gate.

12. The farrowing crate according to claim 11 wherein the trough is fixed to the flooring such that the opening of the gate moves the hopper away from a front edge of the trough.

13. The farrowing crate according to claim 1 wherein the raised transverse restriction member includes a front surface, a rear surface and a smoothly curved top edge.

14. The farrowing crate according to claim 13 wherein the front surface and the rear surface are inclined to form an inverted V-shape in cross-section.

15. The farrowing crate according to claim 1 wherein the raised transverse restricting member has a height no greater than 2.0 inches from the base plate.

16. A farrowing crate comprising;
a cage defined by a front wall, a rear wall and two side walls shaped and arranged to contain a farrowing sow and its piglets;
a flooring shaped and arranged within the cage such that the sow can lie on the flooring within the cage and can stand at will for taking feed and water;
the flooring being shaped and arranged to include a sow section for receiving the sow when lying or standing and at least one side portion for receiving the piglets;
the cage being arranged to confine the sow within the sow section of the flooring;
and a feeder at the front wall for supplying feed to the sow when standing;
the feeder comprising;
a trough for receiving feed for taking by the sow while standing;
a feed supply system for supplying feed into the trough;
the trough comprising a base plate arranged to lie substantially flat on the flooring and extend from the front wall rearwardly over the flooring;
the trough including upstanding side walls at or adjacent the sides of the sow section to restrict feed from escaping to the sides of the trough to the side portion of the flooring;
the base plate forming the trough having a raised transverse restricting member spaced from the front wall and extending generally across the base plate to define a trough area of the base plate forwardly of the transverse restricting member;
the transverse restricting member being shaped so as to have a height which tends to restrain feed from escaping from the trough area rearwardly;
and the transverse restricting member being shaped so as to allow the sow to lie on the flooring with its head extending over the transverse restricting member into the trough area without causing discomfort to the lying sow.

17. The farrowing crate according to claim 16 wherein the trough is attached to the flooring and wherein the front wall includes a gate and the feed supply system is mounted on the gate for movement away from the trough which remains on the flooring as the gate is opened.

18. The farrowing crate according to claim 16 wherein the raised transverse restriction member includes a front surface, a rear surface and a smoothly curved top edge.

19. The farrowing orate according to claim 18 wherein the front surface and the rear surface are inclined to form an inverted V-shape in cross-section.

20. A farrowing crate comprising;
a cage defined by a front wall, a rear wall and two side walls shaped and arranged to contain a farrowing sow and its piglets;
a flooring shaped and arranged within the cage such that the sow can lie on the flooring within the cage and can stand at will for taking feed and water;
the flooring being shaped and arranged to include a sow section for receiving the sow when lying or standing and at least one side portion for receiving the piglets;
the cage being arranged to confine the sow to the area over the sow section of the flooring;
the front wall including a gate which can be opened relative to the cage for passage of the sow from the cage;
and a feeder at the front wall for supplying feed to the sow when standing;
the feeder comprising;
a trough for receiving feed for taking by the sow while standing;
the trough being mounted on the flooring;
a feed supply system for supplying feed into the trough;
the feed supply system being mounted on the gate for movement with the gate away from the trough which remains on the flooring as the gate is opened;
the trough comprising a base plate arranged to lie substantially flat on the flooring and extend from the front wall rearwardly over the flooring;

the base plate forming the trough having a raised transverse restricting member spaced from the front wall and extending generally across the base plate to define a trough area of the base plate forwardly of the transverse restricting member;

the transverse restricting member being shaped so as to have a height which tends to restrain feed from escaping from the trough area rearwardly;

and the transverse restricting member being shaped so as to allow the sow to lie on the flooring with its head extending over the transverse restricting member into the trough area without causing discomfort to the lying sow.

21. The farrowing orate according to claim 20 wherein the raised transverse restriction member includes a front surface, a rear surface inclined to form an inverted V-shape in cross-section and a smoothly curved top edge at au upper apex.

* * * * *